(12) United States Patent
Larson

(10) Patent No.: US 8,421,640 B1
(45) Date of Patent: Apr. 16, 2013

(54) TRACTOR LIFT DETECTION SYSTEM FOR GANTRY CRANES

(76) Inventor: Edward Wayne Larson, Puyallup, WA (US)

( * ) Notice: Subject to any disclaimer, the term of this patent is extended or adjusted under 35 U.S.C. 154(b) by 207 days.

(21) Appl. No.: 12/802,418

(22) Filed: Jun. 7, 2010

(51) Int. Cl.
*G08B 21/00* (2006.01)

(52) U.S. Cl.
USPC ........ 340/685; 340/673; 340/679; 340/686.1; 340/686.6; 212/276

(58) Field of Classification Search ............... 340/10.1, 340/12.5, 12.51, 13.2, 13.24, 13.25, 13.26, 340/13.27, 13.33, 673, 679–686.6, 440, 431, 340/689, 687; 455/77, 79, 432.1, 432.3, 455/435.1, 435.2, 435.3, 450, 452.1, 452.2, 455/41.2, 507, 509; 212/273, 276–281; 180/271, 180/290, 423, 432–449; 370/277
See application file for complete search history.

(56) References Cited

U.S. PATENT DOCUMENTS

| | | | |
|---|---|---|---|
| 5,000,472 A * | 3/1991 | Vick, Jr. ...................... 280/420 |
| 5,260,688 A | 11/1993 | Curry | |
| 5,455,567 A | 10/1995 | Simmons | |
| 5,850,173 A * | 12/1998 | DiCroce et al. .......... 340/426.25 |
| 7,932,816 B2 * | 4/2011 | Schmidt et al. ............... 340/431 |
| 2007/0001436 A1 * | 1/2007 | Hawes et al. ................. 280/735 |
| 2008/0191937 A1 * | 8/2008 | Wisherd et al. .......... 342/357.03 |
| 2008/0218323 A1 * | 9/2008 | Lesesky et al. ............... 340/431 |
| 2009/0146846 A1 * | 6/2009 | Grossman ..................... 340/988 |
| 2009/0198425 A1 * | 8/2009 | Englert .......................... 701/70 |
| 2010/0081447 A1 * | 4/2010 | Qi et al. ..................... 455/452.1 |
| 2011/0092156 A1 * | 4/2011 | Dreifus ....................... 455/41.2 |
| 2011/0181391 A1 * | 7/2011 | Chu .............................. 340/8.1 |

* cited by examiner

*Primary Examiner* — Brian Zimmerman
*Assistant Examiner* — Laura Nguyen
(74) *Attorney, Agent, or Firm* — George A. Leone; Citadel Patent Law

(57) ABSTRACT

An automatic signaling system to prevent a tractor from being accidently lifted with the cargo by a ship to shore gantry crane. The embodiment includes multiple sensors to detect a lifted condition and radio output upon a lifted condition. The radio output channel is determined by an automatic identification system that identifies the crane the tractor is under. Upon receiving a lifted signal the cranes hoist will be stopped and disabled but will still allow lowering until the lifted signal stops.

10 Claims, 6 Drawing Sheets

TRACTOR LIFT DETECTION SYSTEM FOR GANTRY CRANES

FEDERALLY SPONSORED RESEARCH

Not Applicable

SEQUENCE LISTING OR PROGRAM

Not Applicable

BACKGROUND

1. Field

This invention generally relates to container handling gantry cranes including ship to shore, rubber tire gantry, and rail mounted gantry.

2. Prior Art

Every year the ships and cranes get bigger and faster, but the means for loading stay the same. The driver of a tractor pulling a chassis with a container on it pulls under a crane, two or more workers on the ground uncouple the container from the chassis, and the load is lifted onto the ship. The container is coupled to the chassis by strong elliptical toggles in each corner which are rotated in elliptical sockets in the container. Sometimes the chassis is not fully uncoupled and the container, chassis, tractor, and operator are lifted into the air. This usually results in the tractor breaking free and falling to the ground causing injuries to the operator and damage to the equipment. Because the tractors have no rear springs, a drop from as little as 200 mm can jostle the operator and cause neck and back injuries, for this reason an improved system is needed.

Several attempts have been made to resolve this problem. U.S. Pat. No. 5,260,688 issued Nov. 9, 1993 used a user selectable radio transmitter to deactivate the crane if the tractor was rotated around the front wheel and a wand contacted the ground. This system had several drawbacks. The wand could be easily damaged by hitting debris in the container yard. Also by the time the wand contacted the ground the rear of the tractor could be up to 800 mm off of the ground. While it would protect the tractor from being lifted entirely off of the ground, the driver could still be injured. A careless operator could improperly select the radio channel, or forget to altogether. This could leave the tractor unprotected. It could also shut down an adjacent crane while it is in motion causing the crane operator to lose control of the load endangering workers on the ship and dock.

U.S. Pat. No. 5,455,567 describes a system using a photo sensor on the rear of the tractor to trigger a 28 Hz strobe light. The strobe is picked up by a pulse discriminator mounted on the cranes trolley that inhibits the crane hoist. The system is active any time the tractor is running. This system worked fairly well when it was developed but is not adequate for the newer, faster cranes unless slowdowns are added. Photo sensors are unreliable on asphalt. Paint stripes and other color changes can change their set points and result in a delayed hoist deactivation. The reaction time between the strobe and the pulse discriminator can be as high as 500 ms. Modern cranes have hoist speeds of 190 m per minute and accelerate to full speed in 2.0 seconds. If you take into account the strobe does not signal until the tractors rear wheels have lifted to about 150 mm and the crane continues to accelerate, the tractors rear wheels can be 800 to 1500 mm off of the ground before the hoist is stopped. For this reason the later versions of this system added a 2 second slowdown to the crane that limited the hoist speed to 20% of the base speed when hoisting a container from the dock. The later systems also abandoned the photo sensor and used a single axis tilt sensor to trigger the strobe. The single axis tilt sensor still did not detect the lift until the tractor had been lifted about 200 mm off of the ground. Even with the added slow down a perfectly operating system did not stop the hoist until the tractors rear wheels were about 300 mm off of the ground. The single axis tilt sensor was also ineffective at detecting roll that can happen if only one corner is coupled.

ADVANTAGES

The present embodiment solves these problems and has many advantages over prior art. The tractor can pull under any crane and the controller will automatically select the proper radio channel. Another advantage is the improved lift detection. This embodiment can detect lift before the tractor comes off of the ground. This coupled with a microprocessor based controller, and radio output. The signal for hoist deactivation is almost instantaneous. It can stop the hoist before the tractors rear wheels come off of the ground without adding a timed slow down to the crane and affecting production. Another added benefit is a reduction in jostling injuries that are common when the rear of the tractor is dropped from 200 mm or more.

SUMMARY

A system to prevent a tractor-trailer from being accidently lifted by a gantry crane including multiple tilt, height, and pressure sensors on the tractor to trigger a multichannel radio transmitter that will be received by the appropriate crane and stop the hoist from raising while still allowing lowering. The radio channel is automatically determined by communication between the crane and the tractor.

DRAWINGS FIGURES

REFERENCE NUMERALS

| | | | |
|---|---|---|---|
| 10. | Container | 12. | Chassis |
| 14. | Tractor | 16. | Trolley |
| 18. | Head Block | 20. | Spreader |
| 22. | Crane Boom | 24. | Ship |
| 26. | Tractor Controller | 28. | Inductive Proximity Sensor |
| 30. | Hydraulic Cylinder | 32. | Landing Leg |
| 34. | Fifth Wheel Plate | 36. | Ultrasonic Sensor |
| 38. | Dual Axis Tilt Sensor | 40. | Multi-Channel Radio Transmitter |
| 42. | Radio Receiver | 44. | Infrared Emitter |
| 46. | Infrared Decoder | 48. | Junction Box |
| 50. | Messenger Cable | 52. | Spreader Controller |
| 54. | Off Delay Timer | 56. | Shaft |

DETAILED DESCRIPTION OF THE PREFERRED EMBODIMENT

Figure 1:
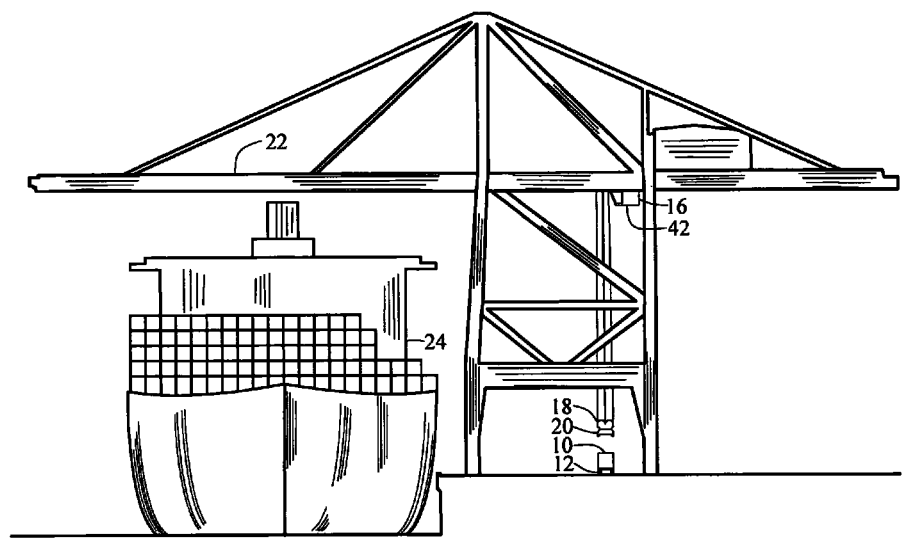
FIG. 1 is an elevational view of a gantry crane that shows a chassis, and container that use the invention.

FIG. 1 illustrates a ship to shore gantry crane for loading and offloading cargo containers from ships. When loading, a container 10 on a chassis 12 is pulled under the crane by a tractor 14 FIG. 2. Tractors are spring-less vehicles that are never used on the highway. Dock workers unlock the container 10 from the chassis 12. A trolley 16 is positioned over the container 10 a head block, 18 and spreader, 20 are lowered into position and lock on to the container 10 which is then hoisted out on to the cranes boom 22 FIG. 1 and loaded onto a ship 24. Sometimes the container 10 is not completely uncoupled and the chassis 12 and tractor 14 are hoisted in to the air. This has resulted in many serious injuries and equipment damage. This invention will prevent the tractor 14 from being hoisted making ship loading a much safer operation as well as reduce equipment damage.

Figure 4:
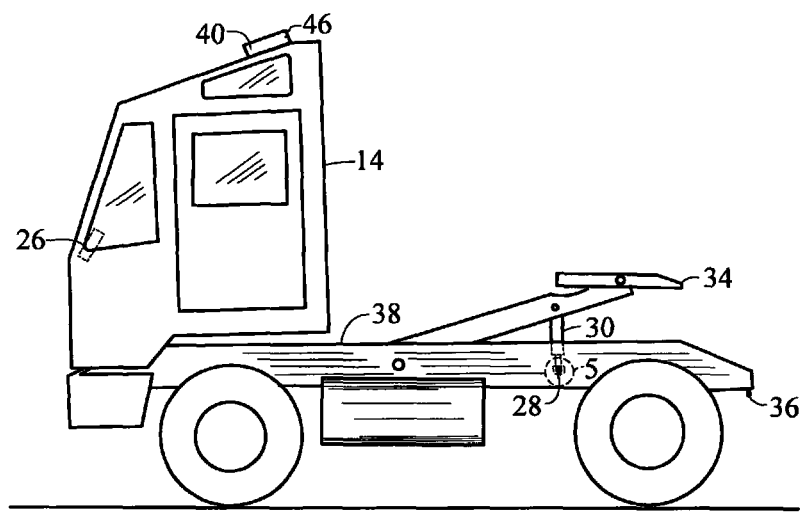
FIG. 4 is an enlarged view of the tractor in FIG. 3.
Figure 5:
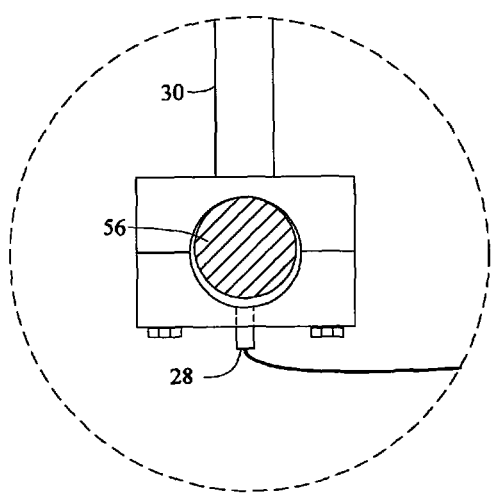
FIG. 5 is an enlarged view of the circled area in FIG. 4

The invention uses a microprocessor based controller 26(FIG. 3) installed in the tractor. The controller 26 constantly monitors the status of several sensors to determine if the tractor 14 has been lifted. The primary sensor is an inductive proximity switch 28 FIG. 4 mounted on a fifth-wheel lift cylinder 30. The tractors 14 are equipped with a hydraulic lift system to raise and lower the front of the chassis so that the operator does not have exit the cab and climb down to the ground to raise and lower a set of landing legs 32 FIG. 3 when coupling or de-coupling from the chassis. This system powers a fifth-wheel plate 34 up and down using double acting hydraulic cylinders 30 FIG. 4. When the tractors fifth wheel plate 34 is pulled upward by the chassis 12 it also pulls up the lift cylinders 30. The lower end of the cylinder is clamped around a shaft 56 FIG. 5 that is connected to the tractors frame. The shaft 56 is 2 mm smaller than the cylinder clamp leaving a gap at the bottom. By drilling and installing a shielded inductive proximity switch 28 any upward movement of the fifth wheel assembly can be detected. Using this as the primary sensor the crane hoist can be stopped before the tractors 14 rear wheels have been lifted off of the ground. This is also before any lift is visually detected by the crane operator. Many injuries are caused when the rear of the tractor is lifted 200 mm or more and dropped jostling the operator. As backups the embodiment uses an ultrasonic sensor 36 mounted on the rear frame of the tractor 14. It will send a digital signal to the tractor controller if the frame of the tractor 14 is lifted a predetermined distance off of the ground. The system also utilizes a dual axis tilt sensor 38 with digital outputs mounted on the tractor frame to sense tilt and roll that will trigger at predetermined angles.

Figure 7:
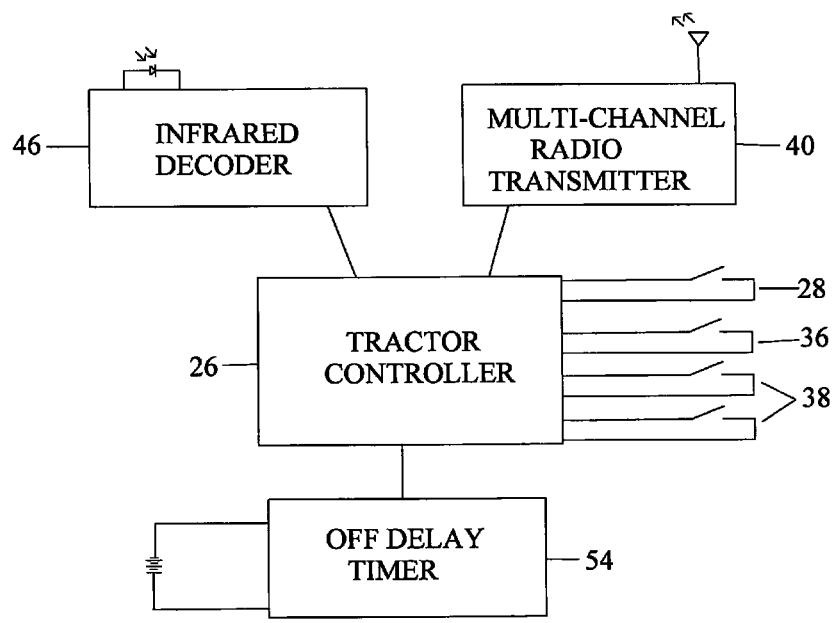
FIG. 7 is a block diagram of the circuitry employed in the tractor.

An off delay timer 54 FIG. 7 is used to keep the system active for several minutes after the tractor has been shut down. The tractors engines are loud and the operators occasionally shut them off to talk to workers on the ground. This could leave them unprotected if the crane lifted them while the engine is off.

Figure 2:
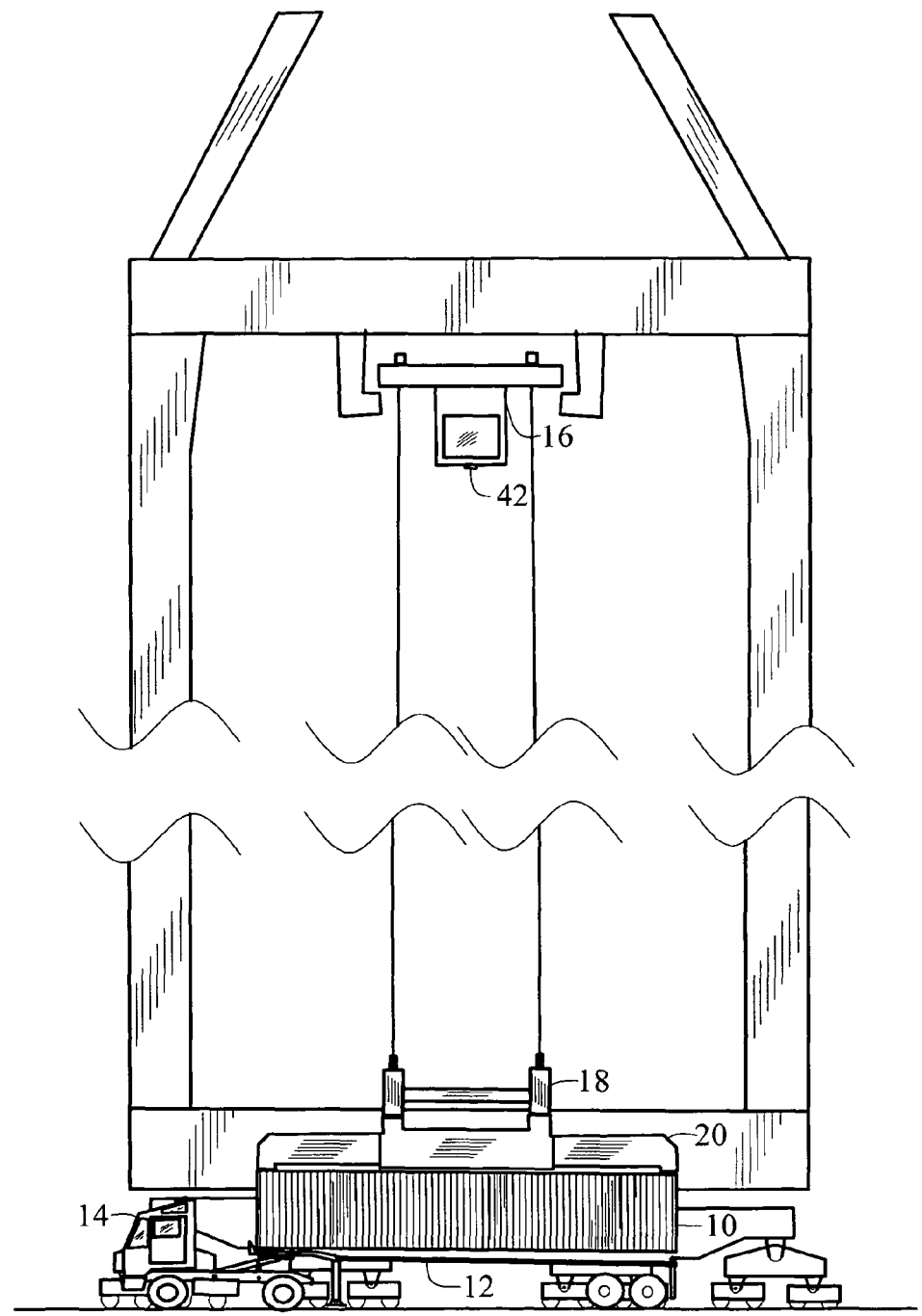
FIG. 2 is a side view of FIG. 1 showing more detail with the tractor visible.
Figure 3:
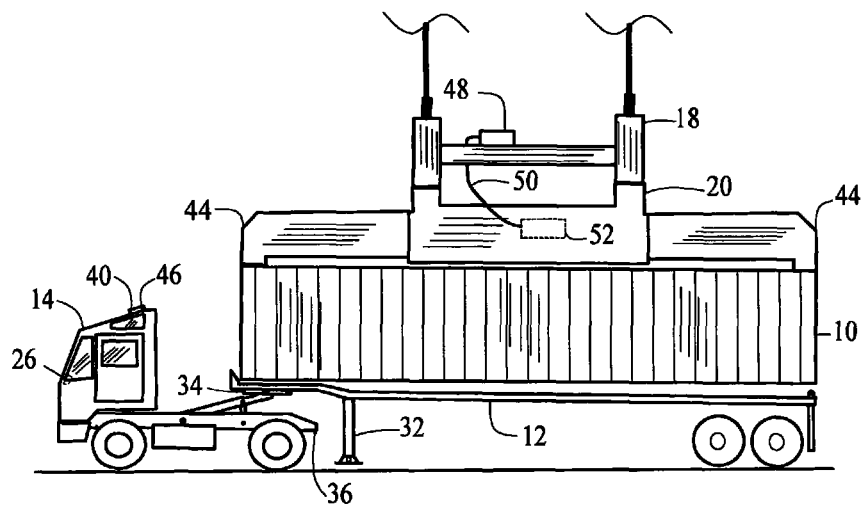
FIG. 3 is an enlarged view of FIG. 2 with the crane structure removed.

When a lift is detected, the crane is signaled via a multi-channel radio transmitter 40 FIG. 3 and received by a radio receiver 42 FIG. 2 with a discrete or relay output mounted on the crane. The receiver 42 is shown mounted under the trolley cab 16 but can be mounted anywhere on the crane where the cranes controller inputs are accessible. When the signal is received the receiver 42 will send a discrete output signal to one of the cranes programmable logic controller inputs. The cranes controller will stop the hoist and trolley motion and prevent further hoisting but will allow lowering until the fault is corrected. The multi channel radios are widely available through many manufactures, one is Abacom Technologies, Etobicoke, Ontario Canada.

The radio channel the tractor transmits on is determined by multi channel infrared emitters 44 FIG. 3 mounted on the ends of the spreader 20 that are received by an infrared decoder 46 with relay outputs. It functions similar to the remote controls in use for televisions, radios, and other devices. The emitters 44 are controlled by the spreader controller 52 that acts the same as pushbuttons on a remote control transmitter. There are several manufactures of these products including Infrared Remote Solutions Inc. Syosset, N.Y. When an infrared signal is received by the tractors decoder 46 it is decoded and the appropriate relay is energized sending a signal to a discrete input on the tractor controller 26 this tells the controller which crane to signal in the event of a lift. The spreader 20 can often be damaged during operations and can be detached quickly from the head block 18 and replaced with a spare to reduce the amount of time the crane is out of service. The spreaders 20 will also fit on multiple cranes, for that reason the emitters 44 cannot transmit a fixed identification code. The cranes identification is set by jumper wires in the head block 18 junction box 48. The head block is permanently attached to the crane by the hoist cables. The identification signal travels through a messenger cable 50 FIG. 3 and to a spreader controller 52 mounted on the spreader. The spreader controller 52 determines the timing, duration, and identification output of the emitters 44. Emitters are required on both ends of the spreader 20 because the tractor can approach from either direction.

To help eliminate the possibility of false triggers the cranes built-in controller will only accept the hoist deactivation for the first several meters of hoisting after locking onto a container on the dock. Also the tractor controller 26 will not be permitted to transmit a signal unless the infrared crane identification signal transmitted from the spreader 20 is present. The only exception to this is if two or more lift sensors are triggered, the tractor controller 26 will signal the last crane it received an infrared identification signal from. A display or mode lights on the dashboard of the tractor will keep the operator updated on crane identification numbers, system faults, and sensor status.

Figure 6:
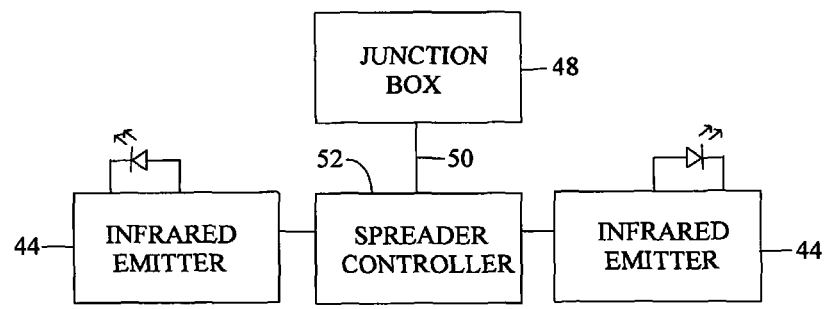
FIG. 6 is a block diagram of the circuitry employed in the crane spreader.

FIG. 6 shows a block diagram of wiring connections in the cranes spreader 20 FIG. 3 and head-block 18. The spreader controller 52 FIG. 6 is a Programmable Logic Controller with digital inputs and outputs. It receives its crane identification signal through permanent jumpers in the cranes head-block junction box 48 transmitted through the messenger cable 50. The controller sends an output to the infrared emitters 44 located on both ends of the spreader. The output controls the channel output, timing, and duration of the infrared emitters that acts as a key press would on a remote control.

FIG. 7 shows a block diagram detailing wiring connections between the tractors components. The tractor controller 26 is a Programmable Logic Controller with digital inputs and outputs and either a small display screen or status lights to keep the operator informed of the system status. Although there are many controllers that are acceptable I have chosen a Horner APG model XLT with a 3 inch touch screen, 2 gigabytes of data logging memory, and 1.2 ms scan time. Connected to the controller are several input and output devices. The first is an infrared decoder 46 that receives the crane identification number when a crane spreader is in range. The decoder 46 has relay outputs that energize when a signal is received, relay one equals crane one and so on. Next is a multi-channel radio transmitter 40 for transmitting a lifted signal to the crane. Multiple sensors inductive proximity 28, ultrasonic 36, and dual axis tilt 38 are connected to inputs on the controller. This embodiment uses extra sensors for added safety but one or more can be eliminated and still achieve the desired results. An off delay timer 54 will control power to the system.

Figure 8:
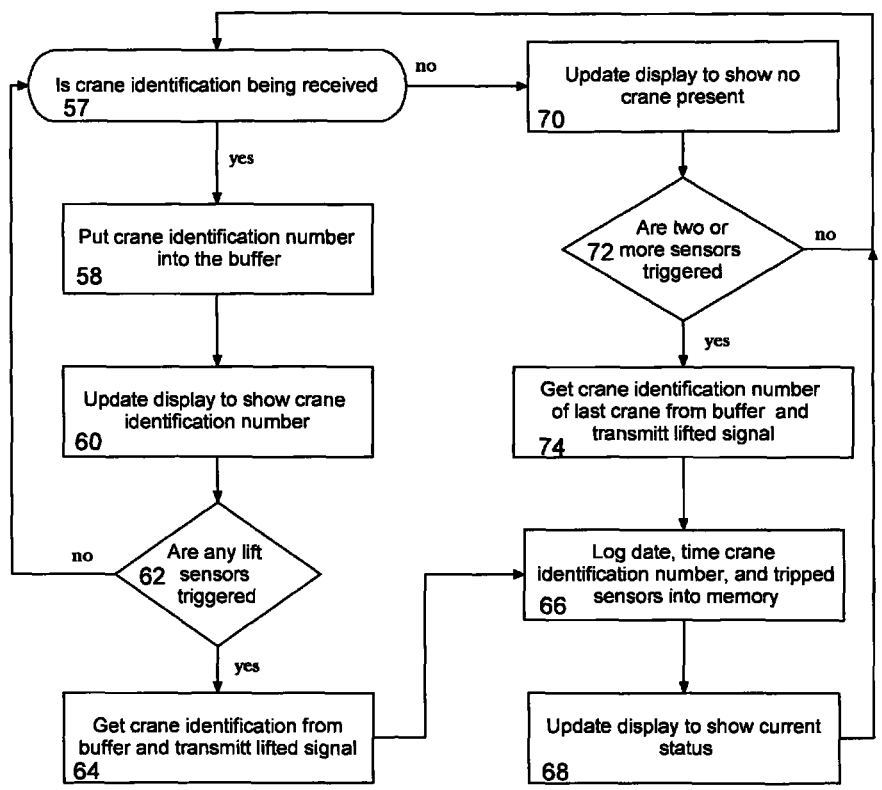
FIG. 8 is a flow chart of the software used in the tractor.

FIG. 8 shows a software flowchart for the tractor controller. To start 57 the controller determines if a crane identification signal is being received. If it is, the controller will save the crane identification number into a buffer 58 for later use. It will also update the operator display 60 to show a crane present. It will then check to see if any lift sensors are triggered 62. If no sensors are triggered it will return to block 57 and start the scan over. If one or more sensors are triggered it will get the crane identification from the buffer and transmit a lifted signal 64 on the proper channel. It will then log the date, time, and the sensor status into memory 66 for later retrieval. It will also update the display to show current status 68. Moving back to 57 if no crane identification is received it will update the display to show no crane present 70. It will continue to check the sensor status and if two or more sensors are triggered 72 it will get the crane identification number of the last crane from the buffer and transmit lifted signal 74. It will then log the date, time, and the sensors tripped into memory 66 for later retrieval. It will also update the display to show current status 68.

CONCLUSION, RAMIFICATIONS, AND SCOPE

Thus the reader will see the embodiment provides a faster and safer system that eliminates human error and can stop the cranes hoist before the tractor is lifted. Furthermore it provides additional advantages in that:

it can react before the crane operator can see any lift, preventing the tractor operator from being jostled in the cab;

it provides a visual display for the operator that shows system status, crane identification number, system faults, and sensor status;

it provides logged data for later retrieval;

it is fully automatic and does not require any operator inputs;

it does not require any production robbing slowdowns;

Although the description above contains much specificity, this should not be construed as limiting the scope of the embodiments but merely providing illustrations of the presently preferred embodiment. For example the crane identification could be accomplished using large bar codes or long range RFID. The primary lift detection sensors could be pressure sensors in the tractors hydraulic system or mounted under the fifth wheel plate to sense a chassis is present.

Thus the scope of the embodiments should be determined by the appended claims and their legal equivalents, rather than by the examples given.

I claim:

1. An improved tractor lift detection system for gantry cranes that interrupts the hoisting circuit of a crane if an unsafe condition is detected in a tractor comprising:

at least one sensing device mounted on said tractor to produce a signal of said unsafe condition;

a radio receiver mounted on said crane to respond to a multi-channel radio transmitter mounted on said tractor to transmit and receive a lifted signal in;

a means for communicating an identification signal from said crane to said tractor;

a microprocessor based tractor controller mounted in said tractor that monitors at least one sensor that produces the lifted signal when the tractor is being lifted, wherein the controller responsively produces said unsafe condition signal; and wherein said crane accepts said unsafe condition signal within the first several meters of hoisting to interrupt the hoisting circuit and stop hoisting, but will not accept said unsafe condition signal and will not interrupt hoisting after said crane has been locked on a container for the first several meters of hoisting so as to reduce false triggers.

2. The improved tractor lift detector of claim 1 wherein one of said at least one sensors comprises a first sensing device mounted on a system controlling a fifth wheel on said tractor thereby sensing lift before said tractor is lifted off of the ground.

3. The improved tractor lift detector of claim 2 wherein the first sensing device comprises a shielded inductive proximity switch.

4. The improved tractor lift detector of claim 2 wherein there are one or more backup sensors in the event said first sensing device on the fifth wheel system fails.

5. The improved tractor lift detector of claim 4 wherein at least one of the one or more backup sensors comprises an ultrasonic sensor.

6. The improved tractor lift detector of claim 1 wherein the identification signal includes an identification number for said crane, said tractor controller automatically detects the identification number and automatically selects a radio channel for transmitting said lifted signal, where the selected radio channel is determined by the identification number.

7. The improved tractor lift detector claimed of 1 wherein said tractor controller will stay active for several minutes after said tractor is turned off so as to allow protection of an operator even if the operator is under said crane.

8. The improved tractor lift detector of claim 1 wherein the tractor controller has data logging abilities.

9. The improved tractor lift detector of claim 1 wherein if two or more said sensors are triggered said tractor controller will transmit said lifted signal to the last known said crane thereby creating added safety should said tractor controller be unable to acquire said identification signal of said crane.

10. The improved tractor lift detector of claim 1 further comprising a dual axis tilt sensor with digital outputs mounted on the tractor so as to sense tilt and roll that will trigger at predetermined angles.

\* \* \* \* \*